(12) United States Patent
Huguenard

(10) Patent No.: US 9,354,724 B2
(45) Date of Patent: May 31, 2016

(54) COMPUTING DEVICE WITH STYLUS HAVING A DEFORMABLE ELASTIC FIXING DEVICE

(75) Inventor: Kathy Huguenard, Redmond, WA (US)

(73) Assignee: NINTENDO CO., LTD., Kyoto (JP)

( * ) Notice: Subject to any disclaimer, the term of this patent is extended or adjusted under 35 U.S.C. 154(b) by 929 days.

(21) Appl. No.: 12/906,330

(22) Filed: Oct. 18, 2010

(65) Prior Publication Data
US 2012/0092303 A1 Apr. 19, 2012

(51) Int. Cl.
*G06F 3/033* (2013.01)
*G06F 3/0354* (2013.01)

(52) U.S. Cl.
CPC .................. *G06F 3/03545* (2013.01)

(58) Field of Classification Search
CPC .................................................. G06F 3/03545
USPC ................... 178/19.01–19.07; 345/179–183; 401/195
See application file for complete search history.

(56) References Cited

U.S. PATENT DOCUMENTS

| | | | |
|---|---|---|---|
| 5,401,917 A | 3/1995 | Yoshida et al. | |
| 5,530,208 A | 6/1996 | Moriconi et al. | |
| 5,703,626 A * | 12/1997 | Itoh | G06F 1/1626 178/19.01 |
| 6,188,363 B1 | 2/2001 | Suzuki et al. | |
| 6,356,443 B2 | 3/2002 | Jenks et al. | |
| 6,388,870 B1 | 5/2002 | Canova et al. | |
| 6,392,639 B1 * | 5/2002 | Lee | G06F 1/1626 178/19.01 |
| 6,532,148 B2 | 3/2003 | Jenks et al. | |
| 6,695,512 B1 * | 2/2004 | Sutherland | B43K 5/17 401/107 |
| 6,819,557 B2 | 11/2004 | Lilenfeld | |
| 7,046,236 B2 | 5/2006 | Blacklock | |
| 7,102,627 B2 * | 9/2006 | Yang et al. | 345/179 |
| 7,226,229 B1 * | 6/2007 | Register | 401/109 |
| 8,164,584 B2 * | 4/2012 | Lin | G06F 1/1626 178/19.01 |
| 2001/0036058 A1 * | 11/2001 | Jenks | G06F 1/1626 361/679.56 |
| 2004/0135765 A1 * | 7/2004 | Kinerk | G06F 1/1626 345/156 |
| 2005/0168500 A1 | 8/2005 | Lee | |

(Continued)

FOREIGN PATENT DOCUMENTS

| | | |
|---|---|---|
| GB | 22077 | 0/1911 |
| WO | 2007/037758 | 4/2007 |
| WO | 2010/037569 | 4/2010 |

OTHER PUBLICATIONS

European Patent Office Search Report issued in EP Appl. 11008279.9 on Feb. 17, 2012.

(Continued)

*Primary Examiner* — Amr Awad
*Assistant Examiner* — Aaron Midkiff
(74) *Attorney, Agent, or Firm* — Nixon & Vanderhye P.C.

(57) ABSTRACT

A stylus used in a computing device includes an elongated shaft, a tip, and a fixing device attached to the elongated shaft. The fixing device is designed to interact with a protrusion on the interior surface of a storage hole of a computing device where the stylus is to be stored. The fixing device can be formed of a deformable elastic material such as a memory foam. As the stylus is inserted into the storage hole of the computing device, the material of the fixing device deforms as it passes the fixing protrusion on the interior surface of the storage hole. Once the fixing device has been inserted past the protrusion, the elastic material of the fixing device resumes its original shape so that it will interfere with the protrusion to prevent the stylus from being accidentally removed from the storage hole.

18 Claims, 7 Drawing Sheets

(56) References Cited

U.S. PATENT DOCUMENTS

2009/0050378 A1* 2/2009 Lee .......................... 178/19.01
2010/0284723 A1* 11/2010 Kiritake ............... B43K 23/008
　　　　　　　　　　　　　　　　　　　　　　401/6

OTHER PUBLICATIONS

European Patent Office Written Opinion issued in EP Appl. 11008279.9 on Feb. 17, 2012.

* cited by examiner

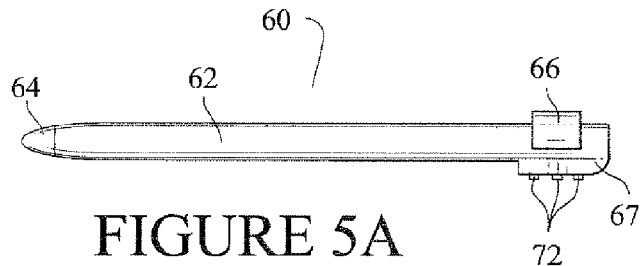
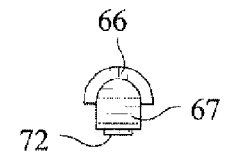
FIGURE 5A  FIGURE 5B
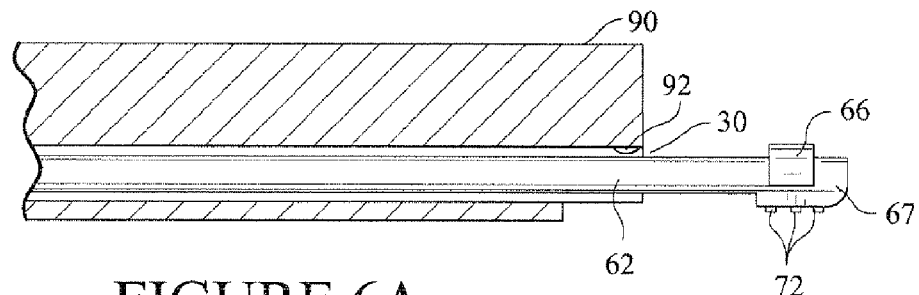
FIGURE 6A
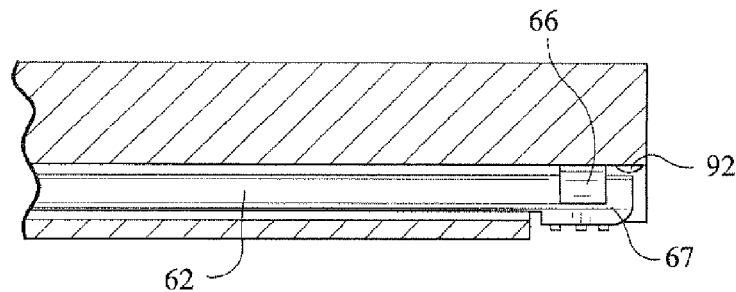
FIGURE 6B
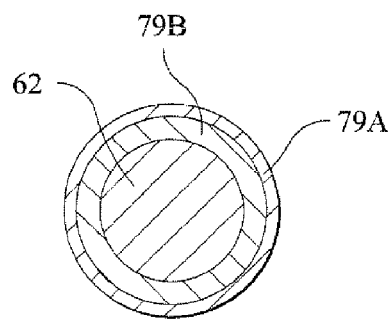
FIGURE 7

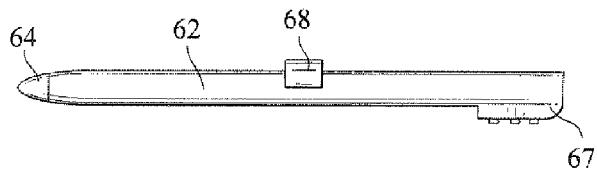 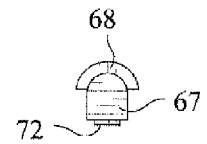
FIGURE 8A          FIGURE 8B
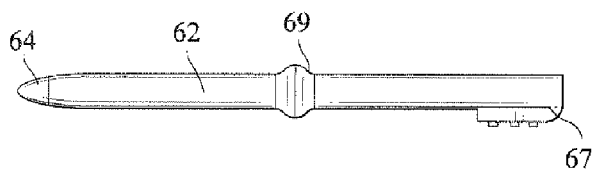 
FIGURE 9A          FIGURE 9B
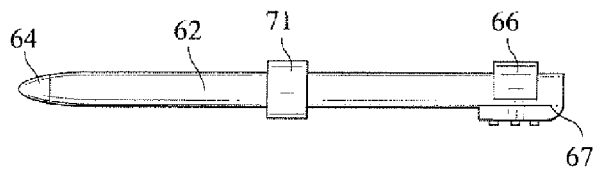 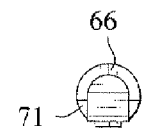
FIGURE 10A         FIGURE 10B

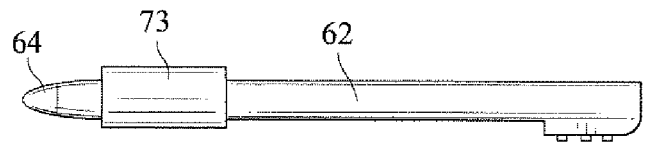 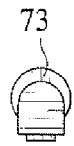
FIGURE 11A                FIGURE 11B
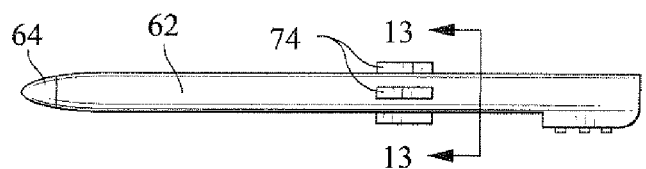
FIGURE 12
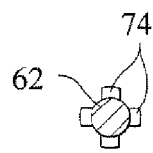
FIGURE 13

COMPUTING DEVICE WITH STYLUS HAVING A DEFORMABLE ELASTIC FIXING DEVICE

BACKGROUND OF THE TECHNOLOGY

The technology is related to computing devices which make use of a handheld stylus for performing various different input operations. A typical handheld computing device 10 that is used with a stylus is illustrated in FIG. 1. As shown in FIG. 1, the computing device includes a base portion 13 and a cover portion 11. The cover portion 11 is attached to the base portion 13 via a hinge connection 24. As shown in FIG. 2, the cover portion 10 can be pivoted so that it can close against the base portion 13.

The computing device includes two display screens 12, 14. One or both of those display screens 12, 14 can be touch sensitive. As a result, it is possible to touch the touch sensitive display screen with a stylus to perform various input operations.

The handheld computing device 10 also includes a cross switch 16 and various input buttons 18, 20 which are used to perform various input operations. In addition, two speaker grills 22 are located in the cover portion 11 to allow sound produced by speakers mounted in the cover portion to be emitted towards the user.

It is common to use a stylus to perform input operations with such a touch sensitive screen. The stylus allows the user to select a relatively small area on the screen with a degree of precision that would not be possible if the user were using a finger.

A typical stylus for this purpose is illustrated in FIG. 3. As shown in FIG. 3, the stylus 40 includes an elongated shaft 42 having a tip 44. The rear 46 of the stylus includes an engagement portion 47 including a plurality of protrusions 52. As will be explained in greater detail below, the engagement portion 47 allows a user to grasp the stylus to remove it from a storage hole in the computing device.

As illustrated in FIG. 2, the computing device can have a storage hole 30 where the stylus can be stored when it is not in use. This allows the stylus to always be co-located with the computing device so that it is always available to the user for performing input operations.

FIG. 4 is a partial cross-sectional view of the base portion 13 of the computing device illustrated in FIGS. 1 and 2. The partial cross-sectional view, taken along section line IV-IV in FIG. 2, illustrates the stylus 40 partially inserted into the storage hole 30.

As shown in FIG. 3, the rear 46 of the stylus 40 includes a protrusion 48, as well as an elongated aperture 50. The elongated aperture 50 allows the outer surface of the stylus, upon which the protrusion 48 is mounted, to deform inward towards a central longitudinal axis of the stylus.

As shown in FIG. 4, as the stylus 40 is inserted into the storage hole 30, the protrusion 48 on the exterior of the stylus will eventually contact a retaining protrusion 17 formed on an interior wall of the storage hole 30. As the stylus is pushed further into the storage hole 30, the protrusion 48 on the exterior wall of the stylus will deform inward, as allowed by the elongated aperture 50. This allows the protrusion 48 on the exterior of the stylus to move past the fixing protrusion 17 on the interior wall of the storage hole 30. Once the protrusion 48 on the stylus has moved past the fixing protrusion 17, the exterior wall of the stylus will resume its original shape.

Note that there is a cut-out portion 15 on the bottom of the base portion 13 of the computing device. The cut-out portion 15 is designed to receive the engagement portion 47 of the stylus. Once the stylus is fully inserted into the insertion hole 30, the engagement portion 47 on the stylus will be fully received in the cut-out portion 15 in the bottom of the base 13 of the computing device. In addition, the protrusion 48 on the exterior of the stylus will be lodged deeper into the storage hole than the fixing protrusion 17 on the inner wall of the storage hole 30. The interference between the fixing protrusion 17 and the protrusion 48 on the stylus will prevent the stylus from falling out of the hole.

When a user wishes to remove the stylus from the storage hole 30, the user can grip the engagement portion 47 with a thumb or finger, and push the stylus back out of the storage hole 30. When the stylus is being removed from the storage hole, the outer wall of the stylus between the protrusion 48 and the elongated aperture 50 will again deform inward as the protrusion 48 is pulled past the fixing protrusion 17 on the storage hole 30.

While the above described mechanism for holding the stylus in the storage hole is generally acceptable, after an extended period of use, the stylus or the storage hole can become worn or damaged such that it is difficult to securely retain the stylus within the storage hole. For instance, the fixing protrusion 17 on the interior wall of the storage hole 30 can become damaged or worn down. Likewise, the protrusion 48 on the exterior of the stylus could become damaged or worn down. If either of these occur, it may be difficult to retain the stylus in the storage hole.

BRIEF DESCRIPTION OF THE DRAWINGS

FIGS. 5A and 5B are elevation and side views, respectively, of a stylus that can be used with a computing device;

FIG. 6A is a partial cross-sectional view of the computing device with the stylus illustrated in FIGS. 5A and 5B partially inserted into a storage hole;

FIG. 6B is a partial cross-sectional view of the computing device with the stylus illustrated in FIGS. 5A AND 5B fully inserted into the storage hole;

FIG. 7 is a partial cross-sectional view of a portion of a stylus with a two-layer fixing device;

FIGS. 8A and 8B are elevation and side views, respectively, of another stylus that can be used with a computing device;

FIGS. 9A and 9B are elevation and side views, respectively, of another stylus that can be used with a computing device;

FIGS. 10A and 10B are elevation and side views, respectively, of another stylus that can be used with a computing device;

FIGS. 11A and 11B are elevation and side views, respectively, of another stylus that can be used with a computing device;

FIG. 12 is an elevation of another stylus that can be used with a computing device;

FIG. 13 is a sectional view of the stylus illustrated in FIG. 12 taken along section line XIII-XIII;

DETAILED DESCRIPTION OF PREFERRED EMBODIMENTS

Figure 1:
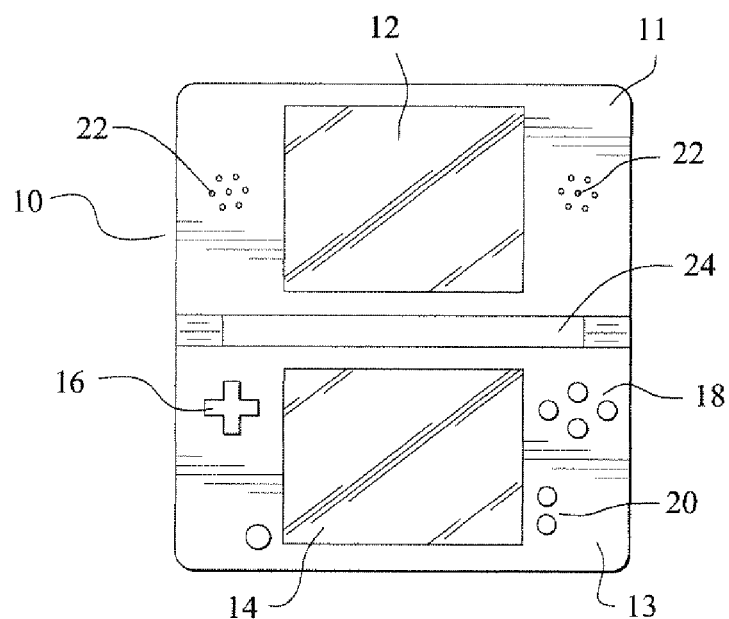
FIG. 1 is a diagram of a handheld computing device that makes use of a stylus.
Figure 2:
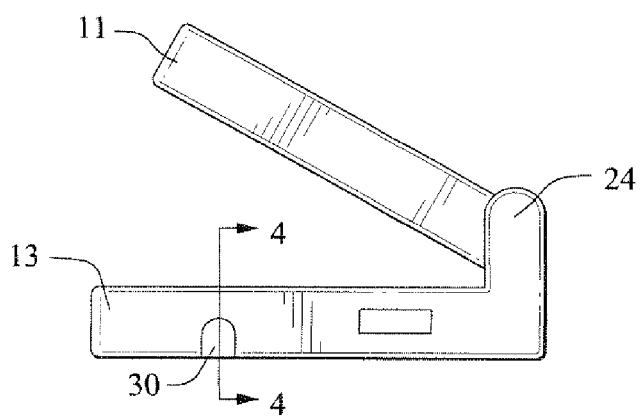
FIG. 2 is a side view of the handheld computing device illustrated in FIG. 1, with the cover portion partially open.
Figure 3:
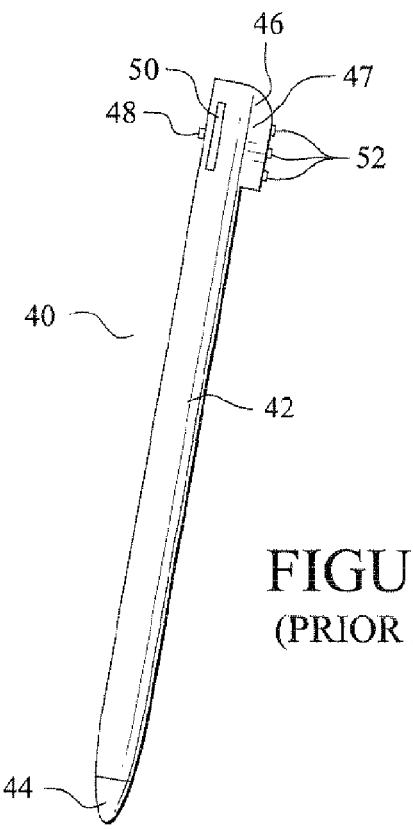
FIG. 3 is a diagram of a stylus that can be used with the handheld computing device illustrated in FIGS. 1 and 2.

FIGS. 5A and 5B show a first embodiment of a stylus that can be used with a computing device. The stylus 60 includes an elongated shaft 62 with a tip 64. The rear of the stylus 60 includes an engagement portion 67 with ridged gripping protrusions 72. In addition, a deformable elastic fixing device 66 is also formed at the rear of the stylus. The fixing device comprises a U-shaped layer of a deformable elastic material.

FIGS. 6A and 6B show how the stylus 60 illustrated in FIGS. 5A and 5B can be inserted into a storage hole 30 of a computing device 90. The storage hole 30 includes a fixing protrusion 92 located on an inner wall of the storage hole adjacent the opening of the storage hole. As shown in FIGS. 6A and 6B, as the stylus 60 is inserted into the storage hole, the fixing device 66 on the end of the stylus will eventually contact the fixing protrusion 92 in the storage hole 30. Because the fixing device is formed of a deformable elastic material, the fixing device is able to deform as it is pushed past the fixing protrusion 92. Once the stylus has been fully inserted into the storage hole, as illustrated in FIG. 6B, the material of the fixing device will expand outward again to resume its original shape, as illustrated in FIG. 6B. At this point, interference between the material of the fixing device 66 and the fixing protrusion 92 will prevent the stylus from accidentally falling out of the storage hole 30.

The fixing device 66 can be formed of any suitable material which is capable of deforming in order to move past a fixing protrusion on a storage hole, and which also is capable of then resuming its original shape to provide an interference fit which prevents the stylus from accidentally being removed from the storage hole. Various types of synthetic materials and elastic foam materials may be suitable for forming the fixing device 66. For instance, the fixing device 66 could be formed of a memory foam material.

In some embodiments, the storage hole 30 might not include a fixing protrusion. In these embodiments, the fixing device would have an expanded shape that is larger than the portion of the fixing hole in which it rests when the stylus is fully inserted into the storage hole. Inserting the stylus into the storage hole would cause the fixing device to be partially compressed against the walls of the storage hole, and the friction provided by this compression would act to keep the stylus in place within the storage hole.

Figure 4:
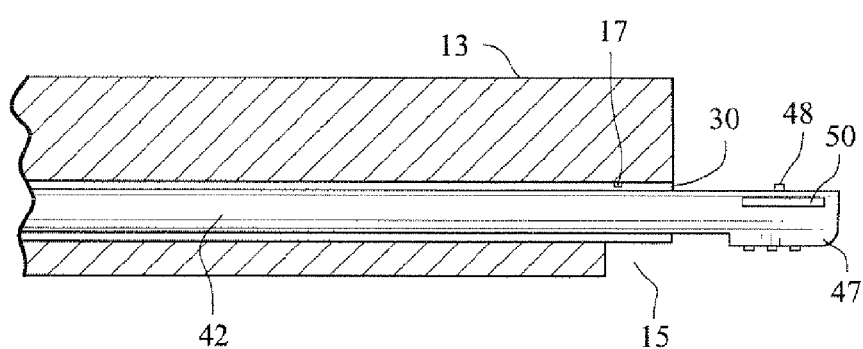
FIG. 4 is a partial cross-sectional view of the bottom portion of a handheld computing device as illustrated in FIGS. 1 and 2, taken along section line IV-IV in FIG. 2.

Also, in some embodiments, a stylus might include a fixing protrusion 17 as illustrated in FIG. 4, and a corresponding protrusion 48 may be provided on the wall of the storage hole, as also illustrated in FIG. 4. However, the stylus would also include a compressible fixing device 66 like the one illustrated in FIGS. 5A and 5B. The compressible fixing device 66 would be located on the stylus further toward the back end of the stylus than the fixing protrusion 17, so that the compressible fixing device 66 would not contact the corresponding protrusion 48 on the wall of the storage hole.

In this type of an embodiment, a separate fixing protrusion 92 may or may not be provided on the inner wall of the storage hole. If the fixing protrusion 92 is not provided, the expended shape of the compressible fixing device would be larger than the interior diameter of the storage hole. As a result, the friction between the walls of the storage hole and the outer surface of the compressible fixing device, as well as the interference between the fixing protrusion 17 on the stylus and the corresponding protrusion 48 on the wall of the storage hole would both help to retain the stylus in the storage hole.

A fixing device could also be formed from multiple layers, as illustrated in FIG. 7. In this embodiment, the fixing device extends all the way around the exterior circumference of the elongated shaft 62 of the stylus. The fixing device includes a durable outer cover layer 79A, and an elastic material layer 79B positioned between the shaft 62 of the stylus and the cover layer 79A. The cover layer 79A could have a relatively low coefficient of friction, to aid the fixing device in sliding past a fixing protrusion in a storage hole. The cover layer 79A would help to prevent the elastic material layer 79B from being damaged as the stylus is pushed past a fixing protrusion in a storage hole.

In alternate embodiments, more than two layers could be used to form a fixing device. For instance, the fixing device could include a cover layer and two elastic material layers, where each of the elastic material layers has different properties.

The fixing device can also be located at various different positions along the length of the stylus. An alternate embodiment of the stylus is illustrated in FIGS. 8A and 8B. As shown therein, the fixing device 68 in this embodiment is located midway long the elongated shaft 62 of the stylus. In this embodiment, the fixing device 68 still has a U-shaped structure which extends partway around the exterior circumference of the elongated shaft 62.

FIGS. 9A and 9B illustrate another embodiment of a stylus. In this embodiment, the material forming the fixing device 69 extends all the way around the exterior circumference of the shaft 62. In addition, the leading and trailing edges of the band of material forming the fixing device 69 taper down toward the exterior surface of the elongated shaft 62. Forming the leading and trailing edges as tapered surfaces, as shown in FIG. 9, can help to ease the insertion and removal of the stylus from the storage hole within a computing device.

In the embodiment illustrated in FIGS. 10A and 10B, two separate fixing devices are located along the length of the elongated shaft 62. A first fixing device 66 is formed at the rear of the stylus, and a second fixing device 71 is located midway along the length of the elongated shaft 62. In this embodiment, the first fixing device 62 is a U-shaped band of material, similar to the one illustrated in FIGS. 5A and 5B. However, the second fixing device 71 is a band of material which extends all the way around the exterior circumference of the elongated shaft 62. In this embodiment, the second fixing device 71 does not have tapered leading and trailing edges.

FIGS. 11A and 11B show another embodiment of a stylus. In this embodiment, the fixing device 73 is formed as a wide band of elastic material that extends all the way around the circumference of the elongated shaft 62 adjacent the tip of the stylus. In this embodiment, the fixing device 73 could serve a dual purpose as both the fixing mechanism for preventing the stylus from being accidentally removed from a storage hole and also as the portion of the stylus which is to be gripped by a user.

Many of the stylus devices used with portable computing devices are quite thin. They are made thin to minimize the size of the storage hole that must be located on the computing device. However, this generally results in the stylus being thinner than a typical writing instrument. And as a result, many users find a thin stylus to be more awkward than a typical writing instrument.

If the fixing device 73 is mounted on the stylus at a location where a user would grasp the stylus, the diameter of the portion of the stylus that will be gripped by the user increases, making the stylus feel similar to a typical writing instrument. Thus, locating the fixing device 73 where a user would grip the shaft of the stylus, as illustrated in FIG. 11A, could help in make the stylus feel more natural to users.

FIG. 12 shows another embodiment of a stylus. In this embodiment, a plurality of elongated strips of elastic material 74 form the fixing device. The elongated strips of material are attached to the exterior of the elongated shaft 62, and the strips extend in a direction parallel to a longitudinal axis of the stylus.

FIG. 13 is a cross-sectional view taken along section line XIII-XIII in FIG. 12. As shown in FIG. 13, the strips of elastic material 74 extend outward from the shaft 62 of the stylus at locations spaced 90° apart from each other. In alternate embodiments, different numbers of strips of elastic material could also be attached to the exterior of the shaft 62. In some embodiments, the strips of material 74 would be spaced symmetrically around the circumference of the shaft 62. As a result, when the stylus is inserted into a storage hole, the stylus would be substantially centered in the insertion hole by the strips of material 74.

Figures 14A, 14B:
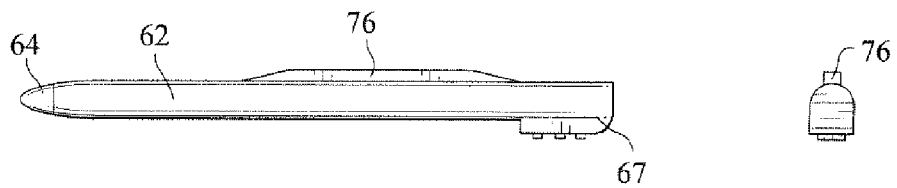
FIGS. 14A and 14B are elevation and side views, respectively, of another stylus that can be used with a computing device.

FIGS. 14A and 14B illustrate another embodiment of a stylus. In this embodiment, a single elongated strip of elastic material forms the fixing device 76. The single elongated strip 76 could be designed to interfere with a fixing protrusion on an interior surface of a storage hole which extends only partway or all the way around the interior circumference of the storage hole.

In some embodiments, the engagement portion 67 of the stylus can also act to ensure that the stylus can only be inserted into the storage hole in a single rotational orientation. The engagement portion 67 would be inserted into a cut out slot at a defined location on the storage hole, as illustrated in FIGS. 6A and 6B. With this type of arrangement, the fixing protrusion formed on the interior surface of the storage hole need only be located at a location where it will interfere with the elongated strip 76 on the exterior of the elongated shaft 62. In the embodiment illustrated in FIGS. 11A and 11B, the cut out slot for receiving the engagement portion would be located 180° apart from the fixing protrusion that will engage the elongated strip 76.

In the embodiments described above, the elastic material was mounted on the stylus, and the compressible elastic material would interact with the interior walls of the storage hole, or with a protrusion on the interior walls of the storage hole. In alternate embodiments, the compressible elastic material could instead be located on the interior wall of the storage hole.

Figure 15A:
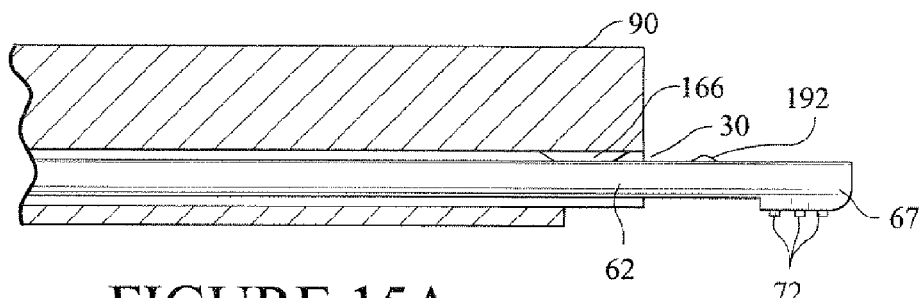
FIG. 15A is a partial cross-sectional view of another computing device with a stylus partially inserted into a storage hole.

FIG. 15A illustrates a cross-sectional view of a portion of a computing device having a storage hole 30. A stylus is partially inserted into the storage hole. In this embodiment, a strip of compressible elastic material 166 is mounted on the interior wall of the storage hole 30. In addition, a solid protrusion 192 is located on the shaft 62 of the stylus.

Figure 15B:
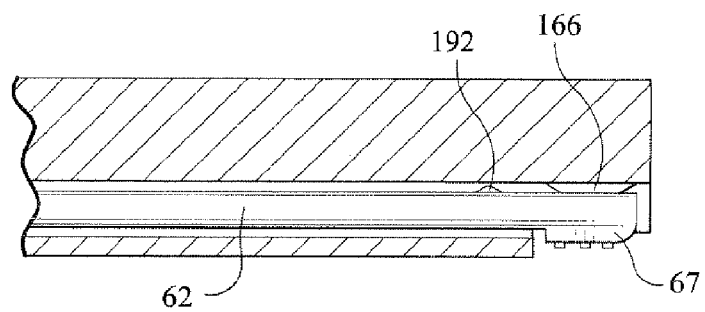
FIG. 15B is a partial cross-sectional view of the computing device with a stylus as illustrated in FIG. 15A, but with the stylus fully inserted into the storage hole.

When the stylus is inserted into the storage hole, the solid protrusion 192 on the shaft of the stylus will ultimately come into contact with the elastic material 166 on the wall of the storage hole. As the stylus is pushed further into the storage hole, the elastic material 166 will deform to accommodate the passage of the solid protrusion 192. Once the stylus is fully inserted into the storage hole, as illustrated in FIG. 15B, the solid protrusion 192 on the shaft of the stylus will be deeper in the storage hole than the location of the elastic material 166. The elastic material 166 will expand outward again. And the interference between the elastic material 166 and the solid protrusion 192 will act to keep the stylus in the storage hole 30.

In still other alternate embodiments, the elastic material 166 on the sidewall of the storage hole could be located at different locations within the storage hole. Likewise, the elastic material could have different forms. The elastic material 166 would form a concentric ring around the interior of the storage hole. Or the elastic material 166 would be formed as strips of material that expend in the longitudinal direction of the storage hole. The elastic material 166 could take any form that helps to ensure that the stylus is retained in the storage hole.

Also, in some embodiments where an elastic material is located on an interior wall of the storage hole, the stylus may not include any corresponding solid protrusion. Instead, the elastic material may be configured such that when the elastic material is fully expanded, the available free space inside the elastic material and the walls of the storage hole is smaller than the diameter of the shaft of the stylus. Thus, whenever the stylus is inserted into the storage hole, the elastic material will be compressed, and friction between the elastic material and the shaft of the stylus will act to retain the stylus in the storage hole.

Figure 16:
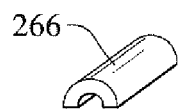
FIG. 16 illustrates a retaining assistance device that could be attached to a stylus of a computing device.
Figure 17:
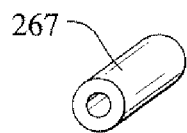
FIG. 17 illustrates another embodiment of a retaining assistance device that could be attached to a stylus of a computing device.
Figure 18:
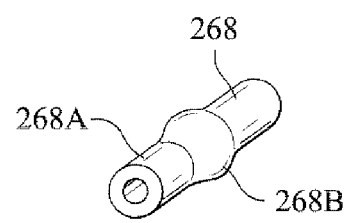
FIG. 18 illustrates another embodiment of a retaining assistance device that could be attached to a stylus of a computing device.

FIGS. 16-18 illustrate various different retaining assistance devices that could be attached to an existing stylus to help the stylus remain inside a storage hole of a computing device. In each case, the retaining assistance device would be formed of an elastic material. And the retaining assistance device would be attached to the exterior of an existing stylus.

The retaining assistance device 166 illustrated in FIG. 16 has a shape similar to the compressible fixing device 66 in the embodiment illustrated in FIGS. 5A and 5B described above.

The retaining assistance device 167 illustrated in FIG. 17 has a shape similar to the compressible fixing device 71 illustrated in FIGS. 10A and 10B described above.

The retaining assistance device illustrated in FIG. 18 has a shape similar to the compressible fixing device 69 illustrated in FIGS. 9A and 9B described above. In this embodiment, the middle portion 268B has a larger diameter than the ends 268A.

In each case, the retaining assistance device would have a size and shape that results in the compressible elastic material being compressed when the stylus is inserted into the storage hole of the computing device. As a result, friction between the elastic material and the interior walls of the storage hole would help to retain the stylus in the storage hole.

In the embodiments illustrated in FIGS. 16-18, a layer of adhesive may be applied to the interior surface of the retaining assistance device that will contact the shaft of the stylus. This adhesive may be covered by a release sheet. This would allow the user to remove the release sheet and then attach the retaining assistance device to the shaft of the stylus.

The sizes and shapes of the retaining assistance devices illustrated in FIGS. 16-18 are only examples. Different embodiments of the retaining assistance devices could have different shapes and sizes.

While the technology has been described in connection with what is presently considered to be the most practical and preferred embodiments, it is to be understood that the technology is not to be limited to the disclosed embodiments, but on the contrary, is intended to cover various modifications and equivalent arrangements included within the spirit and scope of the appended claims.

The invention claimed is:

1. A stylus for use with a computing device, comprising:
an elongated shaft having an outer surface;
a tip at a first end of the elongated shaft; and
a fixing device mounted on an elongated shaft such that the fixing device protrudes outward from a surrounding portion of the outer surface of the elongated shaft, wherein the fixing device comprises:
a first section mounted on a first portion of the elongated shaft; and
a second section mounted on a second portion of the elongated shaft, the first section and second section both including a deformable elastic material layer and a cover mounted over the deformable elastic material layer, wherein the deformable elastic material layer is located only along portions of the elongated shaft corresponding to the first and second sections, and wherein the first and second sections are both configured to hold the stylus in a storage hole of a computing device.

2. The stylus of claim 1, wherein the fixing device is configured such that when the stylus is inserted into a storage hold in a computing device, the deformable elastic material layer of the fixing device can deform inward toward a longitudinal axis of the shaft as the fixing device is pushed past at least one protrusion on an inner surface of the storage hold, and such that once the fixing device has been pushed past the at least one protrusion, the deformable elastic material layer will expand outward again.

3. The stylus of claim 1, wherein the deformable elastic material layer comprise a memory foam.

4. The stylus of claim 1, wherein at least one of the first or second sections of the fixing device forms a circumferential ring around an exterior of the elongated shaft.

5. The stylus of claim 1, wherein at least one of the first or second sections of the fixing device is U-shaped and extends partway around the exterior circumference of the elongated shaft.

6. The stylus of claim 5, further comprising an orientation mechanism that ensures that the stylus can only be inserted into a storage hole of a computing device in a single rotational orientation.

7. The stylus of claim 1, further comprising an orientation mechanism that ensures that the stylus can be inserted into a storage hole of a computing device in a limited number of rotational orientations.

8. The stylus of claim 1, wherein the first section forms a circumferential ring around an exterior of the elongated shaft, and wherein the second section is U-shaped and extends partway around the exterior circumference of the elongated shaft.

9. The stylus of claim 1, wherein the first section forms a circumferential ring around an exterior of the elongated shaft, and wherein the second section forms a thin strip that extends along the exterior of the elongated shaft in a direction parallel to the longitudinal axis of the elongated shaft.

10. The stylus of claim 1, wherein at least one of the first or second sections of the fixing device forms at least one thin strip that extends along the exterior of the elongated shaft in a direction parallel to the longitudinal axis of the elongated shaft.

11. The stylus of claim 10, wherein the ends of the at least one thin strip taper inward toward the exterior surface of the elongated shaft.

12. The stylus of claim 1, wherein the fixing device comprises a plurality of thin strips that extend along the exterior of the elongated shaft in a direction parallel to the longitudinal axis of the elongated shaft, wherein the plurality of thin strips are arranged symmetrically around the exterior circumference of the elongated shaft.

13. The stylus of claim 12, wherein the ends of the plurality of thin strips taper inward toward the exterior surface of the elongated shaft.

14. The stylus of claim 1, further comprising an extraction mechanism that can be engaged by a user to aid in removing the stylus from a storage hole of a computing device.

15. The stylus of claim 14, wherein the extraction mechanism comprises an engagement surface located at a second end of the elongated shaft that is opposite the tip and that is exposed from the storage hole of the computing device when the stylus is mounted in the storage hole.

16. The stylus of claim 14, wherein the extraction mechanism also acts to ensure that the stylus can only be inserted into the storage hole of the computing device in a single rotational orientation.

17. A computing device comprising the stylus of claim 1.

18. The computing device of claim 17, wherein the computing device further comprises a storage hole that is configured to receive the stylus through an opening, and wherein at least one protrusion is formed on an interior surface of the storage hole, the at least one protrusion being located along the storage hole such that when the stylus is fully inserted into the storage hole, the at least one protrusion is located closer to the opening of the storage hole than the fixing device on the stylus.

* * * * *